United States Patent [19]
Kiyooka et al.

[11] Patent Number: 6,133,184
[45] Date of Patent: Oct. 17, 2000

[54] CATALYST FOR CATALYTIC OXIDATION USE

[75] Inventors: Yasushi Kiyooka; Masaaki Okuno, both of Himeji, Japan

[73] Assignee: Nippon Shokubai Co., Ltd., Osaka, Japan

[21] Appl. No.: 09/165,134

[22] Filed: Oct. 2, 1998

[30] Foreign Application Priority Data

Oct. 3, 1997 [JP] Japan ..................... 9-271602

[51] Int. Cl.$^7$ .................. B01J 29/06; C07D 307/60; C07D 307/89
[52] U.S. Cl. .................. 502/63; 549/239; 549/248; 549/257; 549/309; 549/327
[58] Field of Search .................. 549/248, 239, 549/257; 558/309, 327; 502/63

[56] References Cited

U.S. PATENT DOCUMENTS

| | | | |
|---|---|---|---|
| 4,356,112 | 10/1982 | Nakanishi et al. | 252/435 |
| 4,665,200 | 5/1987 | Nakanishi et al. | 549/239 |
| 4,760,453 | 7/1988 | Hieda | 358/213.16 |
| 4,939,280 | 7/1990 | Inoue et al. | 546/286 |

FOREIGN PATENT DOCUMENTS

| | | |
|---|---|---|
| 0163231 A1 | 12/1985 | European Pat. Off. . |
| 0196601 | 10/1986 | European Pat. Off. . |
| 0290996 A1 | 11/1988 | European Pat. Off. . |
| 0539878 A2 | 5/1993 | European Pat. Off. . |
| 0744214 A1 | 11/1996 | European Pat. Off. . |
| 57-105241 | 6/1982 | Japan . |
| 57-105241A | 6/1982 | Japan . |
| 09085096A | 3/1997 | Japan . |
| 9-85096 | 3/1997 | Japan . |

*Primary Examiner*—Bernard Dentz
*Attorney, Agent, or Firm*—Staas & Halsey LLP

[57] ABSTRACT

A carrier containing silicon carbide, inorganic bonding component, and at least one oxide selected from the group consisting of a niobium oxide, an antimony oxide, and a tungsten oxide carries at least one oxide selected from the group consisting of a vanadium oxide and a molybdenum oxide as catalytically active component. An inexpensive catalyst for catalytic oxidation use can be thus offered that does not change its properties over a period of time, that boasts stable catalytic activity over a period of time, and that is suitable for, e.g., manufacture of an acid anhydride and a nitrile compound by conducting a catalytic gas-phase oxidation reaction (partial oxidation reaction) on a hydrocarbon.

13 Claims, No Drawings

CATALYST FOR CATALYTIC OXIDATION USE

FIELD OF THE INVENTION

The present invention relates to a catalyst for catalytic oxidation use suitably used as a catalyst in, for example, manufacturing an acid anhydride and a nitrile compound from a hydrocarbon by a catalytic gas-phase oxidation reaction (partial oxidation reaction), and methods for manufacturing an acid anhydride and a nitrile compound using the catalyst.

BACKGROUND OF THE INVENTION

Conventionally, a carrier-type catalyst composed of a heat resistant inorganic carrier carrying catalytically active component is generally used in a catalytic gas-phase oxidation reaction (partial oxidation reaction) for industrial purposes. Suitably used as such a carrier are materials that are stable thermally and chemically, that does not interfere with a reaction, and that does not react with the catalytically active component, and preferably materials that boast excellent heat conductivity so that the temperature in the reaction field can be maintained at a constant value by releasing reaction heat from the system.

Materials satisfying those conditions include self-sintering bodies of silicon carbide of a high purity which have been widely used as a carrier of a catalyst for practical uses. As examples, Japanese Laid-Open Patent Application No. 57-105241/1982 (Tokukaisho 57-105241) discloses the sintering bodies being suitably used as a carrier of a catalyst for synthesising phthalic anhydride from o-xylene or naphthalene, Japanese Laid-Open Patent Application No. 62-78/1987 (Tokukaisho 62-78) discloses a method of manufacturing maleic anhydride from benzene using a catalyst composed of the sintering body carrying catalytically active component, Japanese Laid-Open Patent Application No. 61-28456/1986 (Tokukaisho 61-28456) discloses a catalyst composed of the sintering body carrying catalytically active component as a catalyst for synthesising pyromellitic anhydride from 1,2,4,5-tetramethyl benzene, and Japanese Laid-Open Patent Application No. 64-63563/1989 (Tokukaisho 64-63563) discloses the sintering bodies being suitably used as a carrier of a catalyst for synthesising benzonitrile from toluene.

Nevertheless, since silicon carbide has a very high sintering temperature, a massive amount of energy, such as electricity, needs be used to produce a molded product that is a self-sintering body made by sintering. In addition, the sintering of silicon carbide needs be conducted under a non-oxidation atmosphere using an inert gas such as nitrogen gas. Therefore, those costs, including the electricity bill, add up and render the self-sintering of silicon carbide very expensive.

Incidentally, minerals such as steatite have a relatively low sintering temperature and can be sintered under an oxidation atmosphere. Self-sintering bodies of those minerals can be therefore manufactured at low costs. However, the self-sintering bodies of the minerals are inferior to the self-sintering body of silicon carbide in chemical stability and heat conductivity.

In light of the above fact, Japanese Laid-Open Patent Application No. 9-85096/1997 (Tokukaihei 9-85096) discloses a method of manufacturing a silicon-carbide-based inexpensive carrier, i.e., a carrier composed of silicon carbide along with silicon dioxide and mullite as inorganic binding component.

The carrier made from silicon carbide along with silicon dioxide and mullite as inorganic binding component exhibits excellent heat conductivity inherent to silicon carbide and can be formed into a molded product of a desired shape. However, such a carrier largely changes its properties over a period of time. So, conventional catalysts for catalytic oxidation use made from the carrier have a disadvantage of unstable catalytic activity over a period of time.

SUMMARY OF THE INVENTION

In view of the problems, an object of the present invention is to offer an inexpensive catalyst for catalytic oxidation use that does not change its properties over a period of time and that boasts stable catalytic activity over a period of time.

In order to solve the above conventional problems, the inventors of the present invention have diligently conducted researches on the catalysts for catalytic oxidation use. As a result, the inventors of the present invention have found that a catalyst for catalytic oxidation use including: a carrier containing silicon carbide, inorganic bonding component, and at least one oxide selected from the group consisting of a niobium oxide, an antimony oxide, and a tungsten oxide; and at least one oxide selected from the group consisting of a vanadium oxide and a molybdenum oxide as catalytically active component carried by the carrier is inexpensive, does not deteriorate over a period of time, boasts stable catalytic activity over a period of time, and exhibits excellent initial performance. In addition, the inventors of the present invention have found that the yield and selectivity of a targeted acid anhydride and nitrile compound can be improved by conducting a catalytic oxidation reaction, for example, a catalytic gas-phase oxidation reaction (partial oxidation reaction), on a hydrocarbon with the catalyst for catalytic oxidation use, which has led to the completion of the invention.

In order to accomplish the object, a catalyst for catalytic oxidation use in accordance with the present invention is characterised in that it includes:

a carrier containing silicon carbide, inorganic bonding component, and at least one oxide selected from the group consisting of a niobium oxide, an antimony oxide, and a tungsten oxide; and at least one oxide selected from the group consisting of a vanadium oxide and a molybdenum oxide as catalytically active component carried by the carrier.

The carrier composing the catalyst for catalytic oxidation use can be manufactured at much lower cost than a conventionally used self-sintering body of silicon carbide. Therefore, the catalyst for catalytic oxidation use can be manufactured very economically by using the above carrier, and thereby offers great economic advantages that can be exploited for industrial use.

For a fuller understanding of the nature and advantages of the invention, reference should be made to the ensuing detailed description taken in conjunction with the accompanying drawings.

DESCRIPTION OF THE EMBODIMENTS

A catalyst for catalytic oxidation use in accordance with the present invention is a carrier containing silicon carbide as a main component, inorganic bonding component for bonding the silicon carbide together, and at least one oxide selected from the group consisting of a niobium oxide, an antimony oxide, and a tungsten oxide (hereinafter, will be referred to as the oxide A), and carries at least one oxide selected from the group consisting of a vanadium oxide and a molybdenum oxide as catalytically active component. The oxide(s) selected from the group consisting of a niobium oxide, an antimony oxide, and a tungsten oxide in accordance with the present invention includes salts that form an oxide by being calcined.

The inorganic bonding component is not limited in any particular manner, specifically being at least one inorganic material selected from the group consisting of silicon dioxide (silica) and mullite ($Al_2O_3 \cdot SiO_2$) as examples.

Properties typically required with a carrier are (1) thermal and chemical stability, (2) non-interference with the reaction and inactiveness with the catalytically active component, and (3) high conductivity to permit the temperature in the reaction field to be maintained at a constant value by releasing reaction heat from the system.

The carrier in accordance with the present invention comes with all of those properties. Silicon carbide used as a main component of the carrier in accordance with the present invention is a compound that is thermally and chemically stable, that boasts a high conductivity, that does not interfere with the reaction, and that does not react with the catalytically active component. The inorganic bonding component is made by sintering an inorganic bonding material and can improve the moldability while preserving the heat conductivity of the silicon carbide. In addition, according to the present invention, the inorganic bonding component can restrain alkaline metals and alkaline earth metals contained in the inorganic bonding component from causing temporal changes in properties of the catalyst for catalytic oxidation use.

The reason is not clear why the use of the carrier can restrain alkaline metals and alkaline earth metals from causing temporal changes in properties of the catalyst for catalytic oxidation use. However, it is presumed that the oxide A contained in the carrier reacts with the alkaline metals and alkaline earth metals contained in the inorganic bonding component, thereby preventing the alkaline metals and alkaline earth metals from reacting with the catalytically active component contained in the carrier and restraining the catalyst for catalytic oxidation use from deteriorating.

The carrier in accordance with the present invention may contain silicon carbide and inorganic bonding component in any blending amount, or in other words, in any weight ratio, however desirably containing 70 weight percent to 95 weight percent or more preferably 80 weight percent to 87 weight percent silicon carbide, 20 weight percent to 3 weight percent or more preferably 15 weight percent to 9 weight percent silicon dioxide as inorganic bonding component, and 10 weight percent to 2 weight percent or more preferably 5 weight percent to 4 weight percent mullite as inorganic bonding component, with the total amount of the silicon carbide and the inorganic bonding component taken to be 100 weight percent.

If the ratio of the silicon carbide is lower than 70 weight percent, i.e. either if the ratio of the silicon dioxide is higher than 20 weight percent or if the ratio of the mullite is higher than 10 weight percent, the heat conductivity falls, possibly presenting an obstacle in maintaining the temperature in the reaction field at a constant value by releasing reaction heat from the system. On the other hand, if the ratio of the silicon carbide is higher than 95 weight percent, i.e. either if the ratio of the silicon dioxide is lower than 3 weight percent or if the ratio of the mullite is lower than 2 weight percent, the weight ratio of the silicon dioxide and the mullite as inorganic bonding component to the silicon carbide is too low, possibly failing to impart good moldability and therefore reducing the sintering temperature only by less than a substantial value.

The carrier may contain an oxide A in any weight ratio, however desirably containing 0.1 weight parts to 2 weight parts or more preferably 0.5 weight parts to 1.5 weight parts oxide A, with the total amount of the silicon carbide and the inorganic bonding component taken to be 100 weight parts.

If the weight ratio of the oxide A to the total amount of the silicon carbide and the inorganic bonding component is lower than 0.1 weight parts, the carrier may possibly fail to restrain alkaline metals and alkaline earth metals contained in the carrier from causing temporal changes in properties of the catalyst for catalytic oxidation use. On the other hand, if the weight ratio of the oxide A to the total amount of the silicon carbide and the inorganic bonding component is higher than 2 weight parts, the properties of the catalyst for catalytic oxidation use using the carrier are negatively affected, possibly undesirably lowering the selectivity of a targeted material.

The carrier preferably contains 0.5 weight percent or less, more preferably 0.3 weight percent or less, or even more preferably 0.1 weight percent or less alkaline metal and alkaline earth metal in total amount in order to restrain the alkaline metals and alkaline earth metals from causing temporal changes in properties of the catalyst for catalytic oxidation use. If the total amount of the alkaline metals and alkaline earth metals is more than 0.5 weight percent, the addition of the oxide A may not possibly successfully restrain temporal changes in properties of the catalyst for catalytic oxidation use using the carrier.

The carrier can be produced easily by mixing and molding silicon carbide with an inorganic bonding material, at least one oxide selected from the group consisting of a niobium oxide, an antimony oxide, and a tungsten oxide, and/or a salt that forms an oxide by being sintered, and thereafter baking the molded mixture obtained.

The inorganic bonding material in accordance with the present invention used as a raw material for the carrier, although not being limited in any particular manner, preferably contains at least clay, because clay allows silicon carbide to be sintered at relatively low temperatures. Moldability can be improved and the sintering temperature can be lowered by including the inorganic bonding component in the carrier.

To impart those properties required with the carrier, the clay used in accordance with the present invention is preferably a clay containing 2 weight percent or less alkaline metal and alkaline earth metal in total amount, specifically being kaolinite such as kibushi clay and/or gairome clay. This is because although silicon carbide contains little alkaline metal and alkaline earth metal, if a clay containing more than 2 weight percent alkaline metal and alkaline earth metal in total amount is used, the carrier produced by sintering may possibly contain more than 0.5 weight percent alkaline metal and alkaline earth metal in total amount.

The inorganic bonding material in accordance with the present invention also preferably further contains colloidal silica. The molded mixture can be baked (sintered) at lower temperatures by further including colloidal silica in the inorganic bonding material.

In order to keep the total amount of the alkaline metals and alkaline earth metals contained in the carrier at 0.5 weight percent or less in the case when the inorganic bonding material further contains colloidal silica, the colloidal silica preferably contains 0.1 weight percent or less and more preferably 0.01 weight percent or less alkaline metal and alkaline earth metal in total amount. If the colloidal silica contains more than 0.1 weight percent alkaline metal and alkaline earth metal in total amount, the carrier produced by sintering may possibly undesirably contain more than 0.5 weight percent alkaline metal and alkaline earth metal in total amount.

In view of the above, the carrier is manufactured preferably from 70 weight parts to 95 weight parts silicon carbide, 25 weight parts to 4 weight parts clay, as the inorganic bonding material, containing 2 weight percent or less alkaline metal and alkaline earth metal in total amount, and 0 weight part to 5 weight parts colloidal silica containing 0.1 weight percent or less alkaline metal and alkaline earth metal in total amount, with these substances making up the total amount of 100 weight parts. Moldability can be improved and the sintering temperature can be lowered with the heat conductivity of the silicon carbide being preserved, by using the silicon carbide and the inorganic bonding material so that the weight ratio of the silicon carbide and the inorganic bonding material falls in the above range.

The oxide A used as raw material for the carrier in accordance with the present invention is, as explained above, at least one oxide selected from the group consisting of a niobium oxide, an antimony oxide, and a tungsten oxide, and hardly scattered at sintering temperatures of 1200° C. to 1500° C. Examples of salts that produce an oxide by being calcined include inorganic salts such as nitrate, sulfate, phosphate, carbonate, chloride, fluoride, and organic salts, such as acetate, oxalate, and citrate, of at least one selected from the group consisting of niobium, antimony, and tungsten.

If a salt that forms an oxide by being calcined is used as an oxide A, the amount used (amount blended) of the salt is not limited, however, being preferably 0.1 weight parts to 2 weight parts and more preferably 0.5 weight parts to 1.5 weight part, with the total amount of the silicon carbide and the inorganic bonding component taken to be 100 weight parts.

In accordance with the present invention, the method of blending the silicon carbide and the inorganic bonding material with the oxide A or with the salt that forms an oxide by being sintered is not limited in any particular manner. Neither is the order in which the substances are blended. Neither is the method of molding the mixture: various known methods can be used including a extrusion method and a method of winding and soldificating a sheet-form material.

The shape of the molded mixture thus obtained, i.e., the shape of the carrier to be manufactured, is not limited in any particular manner. The molded mixture may take various shapes such as spherical, pelletal, or ring (pipe) shapes suited to usage, however preferably having a shape allowing reaction heat of the catalyst for catalytic oxidation use to be easily diffused and removed.

The baking temperature at which the molded mixture is baked is preferably set to 1200° C. to 1500° C., more preferably to 1250° C. to 1350° C., and even more preferably to 1300° C. to 1320° C. If the baking temperature is lower than 1200° C., baking may not possibly progress, possibly failing to produce a carrier with satisfactory strength. On the other hand, if the baking temperature is higher than 1500° C., the porosity becomes too low and the oxide A may be scattered during baking, which is undesirable.

The baking time, being not limited in any particular manner, only needs be determined according to the baking temperature and the composition and size of the molded mixture. The baking can be done in air or under an oxidation atmosphere.

The porosity of the carrier thus produced is preferably 16% to 35%, more preferably 16% to 30%, and even more preferably 16% to 20%. If the porosity is higher than 35%, there possibly occurs a reaction at a surface of the carrier which negatively affects the properties of the catalyst. On the other hand, if the porosity is lower than 16%, the catalytically active component carried becomes easier to come off.

The specific surface area of the carrier is preferably not less than $0.02m^2/g$ and not more than $0.3m^2/g$, and more preferably not less than $0.02m^2/g$ and not more than $0.2m^2/g$. If the specific surface area is more than $0.3m^2/g$, there possibly occurs a reaction at a surface of the carrier which negatively affects the properties of the catalyst. On the other hand, if the specific surface area is less than $0.02m^2/g$, the porosity at a surface of the carrier becomes too low, and the catalytically active component carried becomes easier to come off. If the specific surface area of the carrier falls in an above range, the properties of the catalyst can be exploited to a satisfactory level.

The radical crushing load of the carrier is preferably not less than 8kg, more preferably not less than 10kg, and even more preferably not less than 12kg. If the radical crushing load is less than 8kg, the carrier becomes easier to break and cannot be repeatedly used over a long period of time, which is not desirable.

The catalyst for catalytic oxidation use in accordance with the present invention is manufactured by making the carrier thus produced carry at least one oxide selected from the group consisting of a vanadium oxide and a molybdenum oxide (hereinafter, will be referred to as the oxide B) as catalytically active component.

In the case when the catalytically active component to be carried by the carrier contains two or more oxides selected from the group consisting of a vanadium oxide and a molybdenum oxide as the oxides B, the weight ratio of those oxides to each other is not limited in any particular manner.

The catalyst for catalytic oxidation use in accordance with the present invention is suitably used as a catalyst in manufacture of, for example, an acid anhydride and a nitrile compound by conducting a catalytic gas-phase oxidation reaction (partial oxidation reaction) on hydrocarbon. More specifically, the catalyst for catalytic oxidation use in accordance with the present invention is suitably used for a catalytic gas-phase oxidation reaction manufacturing phthalic anhydride from o-xylene and/or naphthalene, a catalytic gas-phase oxidation reaction manufacturing maleic anhydride from benzene, a catalytic gas-phase oxidation reaction manufacturing pyromellitic anhydride from 1,2,4, 5-tetralkyl benzene (e.g. durene), a catalytic gas-phase oxidation reaction manufacturing an aromatic nitrile from an alkyl-substituted aromatic hydrocarbon (ammoxidation), and a catalytic gas-phase oxidation reaction manufacturing a heterocyclic nitrile from an alkyl-substituted heterocyclic compound (ammoxidation).

If phthalic anhydride is to be manufactured from o-xylene and/or naphthalene, the catalyst for catalytic oxidation use preferably contains vanadium pentoxide as a vanadium oxide as catalytically active component, and further contains an anatase-type titanium dioxide and at least one element selected from the group consisting of alkali metal elements, rare earth elements, sulfur, phosphorus, antimony, niobium, and boron. The weight ratio of the components of the catalytically active component, i.e. composition of the catalytically active component, is not limited in any particular manner.

Phthalic anhydride can be manufactured with a high yield and a high selectivity by conducting a catalytic gas-phase oxidation reaction (partial oxidation reaction) on o-xylene and/or naphthalene with the catalyst for catalytic oxidation use containing the catalytically active component.

If maleic anhydride is to be manufactured from benzene, the catalyst for catalytic oxidation use preferably contains vanadium pentoxide as a vanadium oxide and molybdenum trioxide as a molybdenum oxide as catalytically active component, and further contains phosphorus pentoxide and at least one element selected from the group consisting of alkali metal elements, alkaline earth metal elements, and thallium. The weight ratio of the components of the catalytically active component, i.e. composition of the catalytically active component, is not limited in any particular manner.

Maleic anhydride can be manufactured with a high yield and a high selectivity by conducting a catalytic gas-phase oxidation reaction (partial oxidation reaction) on benzene with the catalyst for catalytic oxidation use containing the catalytically active component.

If pyromellitic anhydride is to be manufactured from 1,2,4,5-tetralkyl benzene such as durene, the catalyst for catalytic oxidation use preferably further contains vanadium pentoxide as a vanadium oxide as catalytically active component, and further contains phosphorus, molybdenum and/or tungsten and at least one element selected from the group consisting of antimony, silver, boron, chromium, cerium, niobium, and sulfur, at least one element selected from the group consisting of alkali metal elements, alkaline earth metal elements, and thallium, and at least one oxide selected from the group consisting of a titanium oxide, a zirconium oxide, and a tin oxide. The weight ratio of the components of the catalytically active component, i.e. composition of the catalytically active component, is not limited in any particular manner.

Pyromellitic anhydride can be manufactured with a high yield and a high selectivity by conducting a catalytic gas-phase oxidation reaction (partial oxidation reaction) on durene with the catalyst for catalytic oxidation use containing the catalytically active component.

If an aromatic nitrile is to be manufactured from an alkyl-substituted aromatic hydrocarbon, as well as if a heterocyclic nitrile is to be manufactured from an alkyl-substituted heterocyclic compound, the catalyst for catalytic oxidation use preferably contains, as catalytically active component, at least one (multiple) oxide selected from the group consisting of titanium dioxide (titania), silicon dioxide, alumina, diatom earth, a double oxide containing titan and silicon, a double oxide containing titan and zirconium, and a triple oxide containing titan, silicon, and zirconium, and vanadium pentoxide as a vanadium oxide, and at further contains least one element selected from the group consisting of molybdenum, tungsten, chromium, antimony, bismuth, phosphorus, niobium, iron, cobalt, nickel, manganese, and copper. The weight ratio of the components of the catalytically active component, i.e. composition of the catalytically active component, is not limited in any particular manner.

An aromatic nitrile can be manufactured with a high yield and a high selectivity by conducting a catalytic gas-phase oxidation reaction (ammoxidation) on an alkyl-substituted aromatic hydrocarbon with the catalyst for catalytic oxidation use containing the catalytically active component. A heterocyclic nitrile can be manufactured with a high yield and a high selectivity by conducting a catalytic gas-phase oxidation reaction (ammoxidation) on an alkyl-substituted heterocyclic compound with the catalyst for catalytic oxidation use containing the catalytically active component.

The method of manufacturing the catalyst for catalytic oxidation use arranged as above, i.e. the method of making the carrier carry the catalytically active component, is not limited in any particular manner. The catalyst for catalytic oxidation use in accordance with the present invention may be either a so-called molded catalyst that is formed by molding catalytically active component, a so-called impregnation catalyst that is formed by impregnating catalytically active component in a polar carrier, or a so-called carrying catalyst that is formed by coating the surface of a carrier with catalytically active component. The method of manufacturing the catalyst for catalytic oxidation use may be chosen according to, for example, the kind of reaction involving the catalyst for catalytic oxidation use and the conditions in reaction processes.

In order to improve the performance of the catalyst for catalytic oxidation use, it is important in a catalytic gas-phase oxidation reaction to consider ventilation resistance of the catalyst for catalytic oxidation use and diffusion and removal of reaction heat on the surface of the catalyst. Especially, when the catalyst for catalytic oxidation use is a carrying catalyst, the performance of the catalyst for catalytic oxidation use is greatly affected by the shape and physical properties, such as heat conductivity, of the carrier. Therefore, the carrier of the carrying catalyst is preferably molded in a spherical shape or in a ring (pipe) shape. The catalyst for catalytic oxidation use can be manufactured by making the surface of a carrier molded in the above shape carry a solution of the catalytically active component dissolved in water or an organic solvent (when the catalytically active component is a salt), or a slurry of the catalytically active component dispersed in water or an organic solvent (when the catalytically active component is an oxide), and thereafter conducting treatments including heating, oxidation, and/or reduction as required.

If the catalyst for catalytic oxidation use in accordance with the present invention is used in a catalytic gas-phase oxidation reaction, the catalyst for catalytic oxidation use only needs be loaded into a reaction pipe made of carbon steel or stainless steel. The reaction pipe is preferably kept at a certain constant temperature by a heat medium such as a melted salt so that the reaction temperature can be adjusted to be a certain temperature by removing reaction heat. The reaction conditions, etc. in the catalytic gas-phase oxidation reaction are not limited in any particular manner.

The present invention will be discussed further in detail by way of embodiments and comparative examples in the following description, which are only illustrative and not restrictive.

EMBODIMENT 1

A catalyst for catalytic oxidation use for manufacturing phthalic anhydride from o-xylene was prepared.

First, a carrier (1) containing silicon carbide, silicon dioxide, mullite, and niobium oxide at a weight ratio of 90:5:5:1 and containing less than 0.2 percent by weight alkali metal elements and alkaline earth metal elements (hereinafter, will be referred to as the alkaline total) in total in weight ratio was prepared by baking at a temperature of 1300° C. The carrier (1) was formed in a ring (pipe) shape having an outer diameter of 6.9mm, an inner diameter of 4.0mm, and a length of 7.0mm. The carrier (1) had a porosity of 26.2%, a specific surface of 0.14m$^2$/g, and a radical crushing load of 10.0kg. The carrier (1) had a composition and physical properties as shown in Table 1.

Meanwhile, a mixture containing an aqueous solution of titanium sulfate was obtained by adding concentrated sulphuric acid having a density of 80 weight percent to ilmenite (titanic iron ore), letting the reaction proceed sufficiently, and thereafter diluting with water. Then, ferrous sulfate was precipitated and thus separated by adding iron pieces as a reducer to the mixture, reducing the iron substance contained in the ilmenite to ferrous ions, then cooling. An aqueous solution of titanium sulfate was thus obtained.

A water-containing titanium oxide was deposited by blowing steam heated to a temperature of 150° C. into the obtained aqueous solution of titanium sulfate. The water-containing titanium oxide was washed with water, with acid, and then with water again, baked for 4 hours at a temperature of 800° C. while circulating air, and crashed with jet stream. This produced an anatase-type titanium oxide (hereinafter, will be referred to simply as a titanium oxide) having an average particle diameter of 0.5μm and a specific surface area of 22m$^2$/g.

Next, 47.25g of ammonium methavanadate, 5.98g of ammonium dihydrogenphosphate, 18,79g of niobium chloride, 8.25g of cesium sulfate, and 36.7g of antimony trioxide were added to an aqueous solution of oxalic acid containing 6400ml of deionised water dissolving 200g of oxalic acid, and agitated sufficiently until dissolved. Then, a slurry containing catalytically active component was prepared by adding 1800g of the titanium oxide to the obtained solution and agitating with an emulsifier.

2000ml of the carrier (1) was loaded into an externally heatable stainless steel rotary furnace having a diameter of 35cm and a length of 80cm, and preliminarily heated to a temperature of 200° C. to 250° C. Subsequently, the slurry was sprayed over the carrier (1) while rotating the rotary furnace, so that every 100ml of the carrier (1) carries 9.5g of the catalytically active component. Thereafter, a catalyst (A) was prepared by baking the slurry-sprayed carrier (1) at a temperature of 580° C. for 6 hours while circulating air.

In addition, a catalyst (B) was prepared by the same procedures as in the above preparation for the catalyst (A) except that 23.92g, instead of 5.98 g, of ammonium dihydrogenphosphate was added, in the preparation for the slurry. The catalyst (B) contained more phosphorous substance ($P_2O_5$) than the catalyst (A). Therefore, the catalyst (B) had higher catalytic activity than the catalyst (A). The catalysts (A) and (B) had a composition of catalytically active component as shown in Table 2.

The catalysts (A) and (B) were then used to conduct a catalytic gas-phase oxidation reaction on o-xylene.

First, an iron reaction pipe, having an inner diameter of 25mm and a length of 3m, soaked in a melted salt (heat medium) maintained at a temperature of 350° C. was loaded with the catalyst (B) as a subsequent stage catalyst up to a height of 1m measured from a reaction gas exhaustion port section provided to a lower part of the iron reaction pipe, and then, on top of the catalyst (B), loaded with the catalyst (A) as a prior stage catalyst up to a height of 1.8m, that is, up to a raw material gas introduction port section provided to an upper part of the iron reaction pipe. Meanwhile, a raw material gas was prepared by mixing 70g of o-xylene with every 1 Nm$^3$ in a standard state of a mixed gas composed of 21 volume percent oxygen gas and 79 volume percent nitrogen gas.

Next, a catalytic gas-phase oxidation reaction was conducted on o-xylene by supplying the raw material gas into the reaction pipe via the raw material gas introduction port section at a space velocity (SV) of 2910 Hr$^{-1}$ (in a standard state). The reaction temperature was 349° C.

Then, the yield in weight percent of phthalic anhydride and that in mole percent of phthalide that was a byproduct (reaction intermediary product) were measured by analysing a reaction gas exhausted at the reaction gas exhaustion port section. The yields at an early phase of the reaction and those after 3 months since the start of the reaction are shown in Table 7. The conversion of o-xylene was nearly 100%. Therefore, the selectivity of the phthalic anhydride can be regarded as being equal to the yield of the phthalic anhydride.

Moreover, the catalyst (A) was analysed for the content quantities in weight percent of the alkali metal oxides and alkaline earth metal oxides before use and after 3 months since the start of the reaction. Results of the analysis are shown in Table 12.

EMBODIMENT 2

A carrier (2) was prepared by the same procedures as the carrier (1) was prepared in Embodiment 1, except that antimony oxide was used in place of niobium oxide. The carrier (2) had a composition and physical properties as shown in Table 1.

A catalyst (C) was prepared by the same procedures as the catalyst (A) was prepared except that the carrier (2) was used, and a catalyst (D) was prepared by the same procedures as the catalyst (B) was prepared except that the carrier (2) was used. The catalysts (C) and (D) had a composition of catalytically active component as shown in Table 2.

The catalysts (C) and (D) were then used to conduct a catalytic gas-phase oxidation reaction on o-xylene. In other words, a catalytic gas-phase oxidation reaction was conducted on o-xylene under the same reaction conditions as those of Embodiment 1, except that the catalyst (D) was used as a subsequent stage catalyst and that the catalyst (C) was used as a prior stage catalyst. The yields of phthalic anhydride and phthalide at an early phase of the reaction and those after 3 months since the start of the reaction are shown in Table 7.

Moreover, the catalyst (C) was analysed for the content quantities in weight percent of the alkali metal oxides and alkaline earth metal oxides before use and after 3 months since the start of the reaction. Results of the analysis are shown in Table 12.

EMBODIMENT 3

A carrier (3) was prepared by the same procedures as the carrier (1) was prepared in Embodiment 1, except that tungsten oxide was used in place of niobium oxide. The carrier (3) had a composition and physical properties as shown in Table 1.

A catalyst (E) was prepared by the same procedures as the catalyst (A) was prepared except that the carrier (3) was used, and a catalyst (F) was prepared by the same procedures as the catalyst (B) was prepared except that the carrier (3) was used. The catalysts (E) and (F) had a composition of catalytically active component as shown in Table 2.

The catalysts (E) and (F) were then used to conduct a catalytic gas-phase oxidation reaction on o-xylene. In other words, a catalytic gas-phase oxidation reaction was conducted on o-xylene under the same reaction conditions as those of Embodiment 1, except that the catalyst (F) was used as a subsequent stage catalyst and that the catalyst (E) was used as a prior stage catalyst. The yields of phthalic anhydride and phthalide at an early phase of the reaction and those after 3 months since the start of the reaction are shown in Table 7.

Moreover, the catalyst (E) was analysed for the content quantities in weight percent of the alkali metal oxides and alkaline earth metal oxides before use and after 3 months since the start of the reaction. Results of the analysis are shown in Table 12.

COMPARATIVE EXAMPLE 1

A comparative carrier (4) was prepared by the same procedures as the carrier (1) was prepared in Embodiment 1, except that niobium oxide was not used. The carrier (4) had a composition and physical properties as shown in Table 1.

A comparative catalyst (G) was prepared by the same procedures as the catalyst (A) was prepared except that the carrier (4) was used, and a comparative catalyst (H) was prepared by the same procedures as the catalyst (B) was prepared except that the carrier (4) was used. The catalysts (G) and (H) had a composition of catalytically active component as shown in Table 2.

The catalysts (G) and (H) were then used to conduct a catalytic gas-phase oxidation reaction on o-xylene. In other words, a catalytic gas-phase oxidation reaction was conducted on o-xylene under the same reaction conditions as those of Embodiment 1, except that the catalyst (H) was used as a subsequent stage catalyst and that the catalyst (G) was used as a prior stage catalyst. The yields of phthalic anhydride and phthalide at an early phase of the reaction and those after 3 months since the start of the reaction are shown in Table 7.

Moreover, the catalyst (G) was analysed for the content quantities in weight percent of the alkali metal oxides and alkaline earth metal oxides before use and after 3 months since the start of the reaction. Results of the analysis are shown in Table 12.

EMBODIMENT 4

A catalyst for catalytic oxidation use for manufacturing phthalic anhydride from naphthalene was prepared.

First, a mixture containing an aqueous solution of titanium sulfate was obtained by adding concentrated sulphuric acid having a density of 80 weight percent to ilmenite, letting the reaction proceed sufficiently, and thereafter diluting with water. Then, ferrous sulfate was precipitated and thus separated by adding iron pieces as a reducer to the mixture, reducing the iron substance contained in the ilmenite, and cooling. An aqueous solution of titanium sulfate was thus obtained.

A water-containing titanium oxide was deposited by blowing steam heated to a temperature of 150° C. into the obtained aqueous solution of titanium sulfate. The water-containing titanium oxide was washed with water, with acid, and then with water again, baked for 4 hours at a temperature of 700° C. while circulating air, and crashed with jet stream. This produced a titanium oxide (an anatase-type titanium oxide) having an average particle diameter of 0.45 $\mu$m and a specific surface area of 33m$^2$/g.

Next, 408.60g of ammonium methavanadate, 10.34g of ammonium dihydrogenphosphate, 17.33g of niobium chloride, 2.72g of cesium sulfate, 3.92g of potassium sulfate, 31.05g of silver nitrate, and 42.35g of antimony trioxide were added to an aqueous solution of oxalic acid containing 6400ml of deionised water dissolving 900g of oxalic acid, and agitated sufficiently until dissolved. Then, a slurry containing catalytically active component was prepared by adding 1800g of the titanium oxide to the obtained solution and agitating with an emulsifier.

2000ml of the carrier (1) prepared in Embodiment 1 was loaded into an externally heatable stainless steel rotary furnace having a diameter of 35cm and a length of 80cm, and preliminarily heated to a temperature of 200° C. to 250° C. Subsequently, the slurry was sprayed over the carrier (1) while rotating the rotary furnace, so that every 100ml of the carrier (1) carries 9.5g of the catalytically active component. Thereafter, a catalyst (K) was prepared by baking the slurry-sprayed carrier (1) at a temperature of 560° C. for 6 hours while circulating air.

In addition, a catalyst (L) was prepared by the same procedures as in the above preparation for the catalyst (K) except that 31.02g, instead of 10.34g, of ammonium dihydrogenphosphate was added in the preparation for the slurry. The catalyst (L) contained more phosphorous substance ($P_2O_5$) than the catalyst (K). Therefore, the catalyst (L) had higher catalytic activity than the catalyst (K). The catalysts (K) and (L) had a composition of catalytically active component as shown in Table 3.

The catalysts (K) and (L) were then used to conduct a catalytic gas-phase oxidation reaction on naphthalene.

First, an iron reaction pipe, having an inner diameter of 25mm and a length of 3m, soaked in a melted salt maintained at a temperature of 365° C. was loaded with the catalyst (L) as a subsequent stage catalyst up to a height of 1m measured from a reaction gas exhaustion port section provided to a lower part of the iron reaction pipe, and then, on top of the catalyst (L), loaded with the catalyst (K) as a prior stage catalyst up to a height of 1.5m. Meanwhile, a raw material gas was prepared by mixing 60g of naphthalene with every 1 Nm$^3$ in a standard state of a mixed gas composed of 10 volume percent steam, 10 volume percent oxygen gas, and 80 volume percent nitrogen gas.

Next, a catalytic gas-phase oxidation reaction was conducted on naphthalene by supplying the raw material gas into the reaction pipe via the raw material gas introduction port section provided to an upper part of the iron reaction pipe at a space velocity (SV) of 2500 Hr$^{-1}$ (in a standard state). The reaction temperature was 361° C.

Then, the yield in weight percent of phthalic anhydride and that in mole percent of naphthoquinone that was a byproduct (reaction intermediary product) were measured by analysing a reaction gas exhausted at the reaction gas exhaustion port section. The yields of phthalic anhydride and naphthoquinone at an early phase of the reaction and those after 3 months since the start of the reaction are shown in Table 8. The conversion of naphthalene was nearly 100%. Therefore, the selectivity of the phthalic anhydride can be regarded as being equal to the yield of the phthalic anhydride.

COMPARATIVE EXAMPLE 2

A comparative catalyst (M) was prepared by the same procedures as the catalyst (K) was prepared in Embodiment 4, except that the carrier (4) was used in place of the carrier (1), and a comparative catalyst (N) was prepared by the same procedures as the catalyst (L) was prepared in Embodiment 4, except that the carrier (4) was used in place of the carrier (1). The catalysts (M) and (N) had a composition of catalytically active component as shown in Table 3.

The catalysts (M) and (N) were then used to conduct a catalytic gas-phase oxidation reaction on naphthalene. In other words, a catalytic gas-phase oxidation reaction was conducted on naphthalene under the same reaction conditions as those of Embodiment 4, except that the catalyst (N) was used as a subsequent stage catalyst and that the catalyst (M) was used as a prior stage catalyst. The yields of phthalic anhydride and naphthoquinone at an early phase of the reaction and those after 3 months since the start of the reaction are shown in Table 8.

EMBODIMENT 5

A catalyst for catalytic oxidation use for manufacturing maleic anhydride from benzene was prepared.

First, 235g of ammonium methavanadate, 142g of ammonium molybdate tetrahydrate, 2.91g of cesium sulfate, 7.45g of sodium carbonate, 20.5g of silver nitrate, and 4.62g of ammonium dihydrogenphosphate were added in this order to an aqueous solution of oxalic acid containing 1000ml of pure water dissolving 250g of oxalic acid, while agitating the aqueous solution sufficiently. Thus, an aqueous solution containing catalytically active component was prepared.

1.8kg of the carrier (1) prepared in Embodiment 1 was loaded into an externally heatable stainless steel rotary furnace having a diameter of 35cm and a length of 80cm, and preliminarily heated to a temperature of 200° C. to 250° C. Subsequently, the aqueous solution was sprayed over the carrier (1) while rotating the rotary furnace, so that every 100ml of the carrier (1) carries 18g of the catalytically active component. Thereafter, a catalyst (O) was prepared by baking the aqueous-solution-sprayed carrier (1) at a temperature of 500° C. for 8 hours under a reducing atmosphere.

In addition, a catalyst (P) was prepared by the same procedures as in the above preparation for the catalyst (O) except that 8.52g, instead of 7.45g, of sodium carbonate and 0.727g, instead of 2.91g of cesium sulfate were added in the preparation for the aqueous solution. The catalysts (O) and (P) had a composition of catalytically active component as shown in Table 4.

The catalysts (O) and (P) were then used to conduct a catalytic gas-phase oxidation reaction on benzene.

First, a stainless steel reaction pipe, having an inner diameter of 25mm and a length of 3.5m, soaked in a melted salt was loaded with the catalyst (P) as a subsequent stage catalyst up to a height of 1.5m measured from a reaction gas exhaustion port section provided to a lower part of the stainless steel reaction pipe, and then, on top of the catalyst (P), loaded with the catalyst (O) as a prior stage catalyst up to a height of 1m. Meanwhile, a benzene-containing air was prepared by mixing 10g of benzene with every 1 Nm$^3$ in a standard state of air. The benzene density of the benzene-containing air is 0.3 volume percent. Next, after adjusting the temperature of the melted salt to 430° C., activation was conducted on the catalysts (O) and (P) by supplying the benzene-containing air into the reaction pipe via the raw material gas introduction port section provided to an upper part of the stainless steel reaction pipe at a space velocity (SV) of 1000 Hr$^{-1}$ (in a standard state) for 15 hours. Meanwhile, a raw material gas was prepared by mixing 50g of benzene with every 1 Nm$^3$ in a standard state of air.

After completing the activation process, the temperature of the melted salt was adjusted to 365° C. Then a catalytic gas-phase oxidation reaction was conducted on benzene by supplying the raw material gas into the reaction pipe via the raw material gas introduction port section at a space velocity (SV) of 2500 Hr$^{-1}$ (in a standard state). The reaction temperature was 363° C.

Then, the yield in weight percent of maleic anhydride and the conversion in percent of benzene were measured by analysing a reaction gas exhausted at the reaction gas exhaustion port section. The yield and the conversion at an early phase of the reaction and those after 3 months since the start of the reaction are shown in Table 9.

COMPARATIVE EXAMPLE 3

A comparative catalyst (Q) was prepared by the same procedures as the catalyst (O) was prepared in Embodiment 5, except that the carrier (4) was used in place of the carrier (1), and a comparative catalyst (R) was prepared by the same procedures as the catalyst (P) was prepared in Embodiment 5, except that the carrier (4) was used in place of the carrier (1). The catalysts (Q) and (R) had a composition of catalytically active component as shown in Table 4.

The catalysts (Q) and (R) were then used to conduct a catalytic gas-phase oxidation reaction on benzene. In other words, a catalytic gas-phase oxidation reaction was conducted on benzene under the same reaction conditions as those of Embodiment 5, except that the catalyst (R) was used as a subsequent stage catalyst and that the catalyst (Q) was used as a prior stage catalyst. The yield in weight percent of maleic anhydride and the conversion in percent of benzene at an early phase of the reaction and those after 3 months since the start of the reaction are shown in Table 9.

EMBODIMENT 6

A catalyst for catalytic oxidation use for manufacturing pyromellitic anhydride from 1,2,4,5-tetramethyl benzene (e.g. durene) was prepared.

First, 28g of ammonium methavanadate was added and dissolved in an aqueous solution of oxalic acid containing 350ml of deionised water dissolving 56g of oxalic acid, then 10.5g of antimony trioxide was added. Next, 239g of titanium oxide (anatase-type titanium oxide) having a specific surface area of 20m$^2$/g measured with a BET (Brunauer-Emmett-Teller) method was added to the aqueous solution, and agitated until sufficiently mixed, before more deionised water was added. Thus, about 900ml of a slurry containing catalytically active component was prepared.

An externally heatable stainless steel rotary furnace having a diameter of 35cm and a length of 80cm was loaded with 900g of the carrier (1) prepared in Embodiment 1, and preliminarily heated to a temperature of 200° C. to 250° C. Subsequently, the slurry was sprayed over the carrier (1) while rotating the rotary furnace, so that every 100g of the carrier (1) carries 5g of the catalytically active component. Thereafter, a catalyst (S) was prepared by baking the slurry-sprayed carrier (1) at a temperature of 550° C. for 6 hours while circulating air.

Meanwhile, 120g of ammonium methavanadate and 18.1g of ammonium molybdate tetrahydrate were added and dissolved in an aqueous solution of oxalic acid containing 700ml of deionised water dissolving 240g of oxalic acid, and agitated sufficiently until dissolved. Next, 3.54g of ammonium dihydrogenphosphate, 4.85g of calcium nitrate, and 8.71g of silver nitrate dissolved in advance in a small amount of deionised water were added to the aqueous solution and agitated sufficiently until dissolved. Thereafter, 20g of a silicon carbide whisker was added and agitated until sufficiently mixed. Thus, about 900ml of a slurry containing catalytically active component was prepared.

Then, an externally heatable stainless steel rotary furnace having a diameter of 35cm and a length of 80cm was loaded with 900g of the carrier (1) prepared in Embodiment 1, and preliminarily heated to a temperature of 200° C. to 250° C. Subsequently, the slurry was sprayed over the carrier (1) while rotating the rotary furnace, so that every 100g of the carrier (1) carries 5g of the catalytically active component. Thereafter, a catalyst (T) was prepared by baking the slurry-sprayed carrier (1) at a temperature of 500° C. for 6 hours while circulating air. The catalysts (S) and (T) had a composition of catalytically active component as shown in Table 5.

The catalysts (S) and (T) were then used to conduct a catalytic gas-phase oxidation reaction on durene.

First, a stainless steel reaction pipe, having an inner diameter of 25mm and a length of 4m, soaked in a melted salt maintained at a temperature of 395° C. was loaded with the catalyst (T) as a subsequent stage catalyst up to a height of 1.7m measured from a reaction gas exhaustion port section provided to a lower part of the stainless steel reaction pipe, then, on top of the catalyst (T), loaded with the catalyst (S) diluted 1/2.5 (weight ratio) by using a self-sintering body of silicon carbide 1.5 times the catalyst (S) in weight as a prior stage catalyst up to a height of 0.8m, and, on further top of that, loaded with DENSTONE® carrier (available from NORTON CHEMICAL PROCESS PRODUCTS CORPORATION) having an average diameter of 8mm up to a height of 0.5m. Meanwhile, a raw material gas was prepared by mixing 30g of durene with every 1 $Nm^3$ in a standard state of a mixed gas composed of 21 volume percent oxygen gas and 79 volume percent nitrogen gas.

Next, a catalytic gas-phase oxidation reaction was conducted on durene by supplying the raw material gas into the reaction pipe via the raw material gas introduction port section provided to an upper part of the stainless steel reaction pipe at a space velocity (SV) of 6000 $Hr^{-1}$ (in a standard state). The reaction temperature was 398° C.

Then, the yield in mole percent of pyromellitic anhydride was measured by analysing a reaction gas exhausted at the reaction gas exhaustion port section. The yield at an early phase of the reaction and that after 3 months since the start of the reaction are shown in Table 10. The conversion of durene was 100% Therefore, the selectivity of the pyromellitic anhydride can be regarded as being equal to the yield of the pyromellitic anhydride.

COMPARATIVE EXAMPLE 4

A comparative catalyst (U) was prepared by the same procedures as the catalyst (S) was prepared in Embodiment 6, except that the carrier (4) prepared in Comparative Example 1 was used in place of the carrier (1), and a comparative catalyst (V) was prepared by the same procedures as the catalyst (T) was prepared in Embodiment 6, except that the carrier (4) prepared in Comparative Example 1 was used in place of the carrier (1). The catalysts (U) and (V) had a composition of catalytically active component as shown in Table 5.

The catalysts (U) and (V) were then used to conduct a catalytic gas-phase oxidation reaction on durene. In other words, a catalytic gas-phase oxidation reaction was conducted on durene under the same reaction conditions as those of Embodiment 6, except that the catalyst (V) was used as a subsequent stage catalyst and that the catalyst (U) was used as a prior stage catalyst. The yield in mole percent of pyromellitic anhydride and the content ratios in volume percent of monoxide gas and dioxide gas at an early phase of the reaction and those after 3 months since the start of the reaction are shown in Table 10.

EMBODIMENT 7

A catalyst for catalytic oxidation use for manufacturing benzonitrile (an aromatic nitrile) from toluene (an alkyl-substituted aromatic hydrocarbon) by ammoxidation was prepared.

First, a carrier (5) was prepared by the same procedures as the carrier (1) was prepared in Embodiment 1, except that the carrier (5) was formed in a spherical shape of 5mm in diameter instead of a ring shape. The carrier (5) had a composition and physical properties as shown in Table 1.

Next, a double oxide containing titan and silicon was prepared. To be more specific, an aqueous sulphuric acid solution of titanyl sulfate having a composition of 250g/L $TiOSO_4$ (measured in terms of $TiO_2$) and 1100g/L $H_2SO_4$ in total was used as a titanium source. Then a diluted aqueous sulphuric acid solution of titanyl sulfate was obtained by adding 153L of the aqueous sulphuric acid solution of titanyl sulfate to 300L of water. Meanwhile, after mixing 280L of 25 weight percent ammonia aqueous solution with 400L of water, 16.9kg of SNOWTEX®-NCS-30 (available from Nissan Chemical Industries, Ltd.), containing about 30 weight percent silica sol (measured in terms of $SiO_2$) was mixed with the ammonia aqueous solution as a silicon source.

Next, a coprecipitated gel of $TiO_2$ and $SiO_2$ was produced by dropping the diluted aqueous sulphuric acid solution of titanyl sulfate to the mixture of SNOWTEX® and ammonia aqueous solution while agitating. After being produced, the coprecipitated gel was left for 15 hours. The obtained coprecipitated gel was collected by filtering, washed with water, dried for 10 hours at a temperature of 200° C., and baked for 6 hours at a temperature of 550° C. while circulating air. The obtained powder (hereinafter, will be referred to as TS powder) had a composition of $TiO_2:SiO_2=$ 85:15 (mole ratio) and a specific surface area of $180m^2/g$ measured with the BET (Brunauer-Emmett-Teller) method.

Next, an aqueous solution of vanadium oxalate was prepared by adding 23.4g of ammonium methavanadate to 200ml of an aqueous solution of oxalic acid having 48g of oxalic acid. An aqueous solution of antimony tartrate was also prepared by adding 51g of antimony trioxide to 1000ml of an aqueous solution of tartaric acid having 153g of tartaric acid. Next, after mixing the two aqueous solutions, 400g of the TS powder was added and agitated until sufficiently mixed. Thus, a slurry containing catalytically active component was prepared.

After 2L of the carrier (5) was preliminarily heated, the slurry was sprayed over the carrier (5) so that every 100g of the carrier (5) carries 10g of the catalytically active component, i.e. so that the carrying rate is 10 weight percent. Thereafter, a catalyst (W) was prepared by baking the slurry-sprayed carrier (5) at a temperature of 550° C. for 5 hours while circulating air. The catalyst (W) had a composition of catalytically active component as shown in Table 6.

The catalyst (W) was then used to conduct a catalytic gas-phase oxidation reaction on toluene, i.e. ammoxidation.

First, a stainless steel reaction pipe, having an inner diameter of 25mm and a length of 5m, soaked in a melted salt maintained at a predetermined temperature was loaded with the catalyst (W) up to a height of 4m measured from a reaction gas exhaustion port section provided to a lower part of the stainless steel reaction pipe. Meanwhile, a raw material gas was prepared composed of 3 volume percent toluene, 6 volume percent ammonia, 10 volume percent oxygen gas, and 81 volume percent nitrogen gas.

Next, a catalytic gas-phase oxidation reaction, i.e. ammoxidation, was conducted on toluene by supplying the raw material gas into the reaction pipe via the raw material gas introduction port section provided to an upper part of the stainless steel reaction pipe at a space velocity (SV) of 900 Hr$^{-1}$ (in a standard state). The reaction temperature was 390° C.

Then, the yield in mole percent of benzonitrile was measured by analysing a reaction gas exhausted at the reaction gas exhaustion port section. The yield at an early phase of the reaction and that after 6 months since the start of the reaction are shown in Table 11.

COMPARATIVE EXAMPLE 5

First, a carrier (6) was prepared by the same procedures as the carrier (5) was prepared in Embodiment 7, except that no niobium oxide was used. The carrier (6) had a composition and physical properties as shown in Table 1.

Next, a comparative catalyst (X) was prepared by the same procedures as the catalyst (W) was prepared in Embodiment 7, except that the carrier (6) was used in place of the carrier (5). The catalyst (X) had a composition of catalytically active component as shown in Table 6.

The catalyst (X) was then used to conduct ammoxidation on toluene. In other words, ammoxidation was conducted on toluene under the same reaction conditions as those of Embodiment 7, except that the catalyst (X) was used. The yield in mole percent of benzonitrile at an early phase of the reaction and that after 6 months since the start of the reaction are shown in Table 11.

TABLE 1

| Composition | Carrier | | | | | |
|---|---|---|---|---|---|---|
| (Weight Ratio) | (1) | (2) | (3) | (4) | (5) | (6) |
| Silicon Carbide | 90 | 90 | 90 | 90 | 90 | 90 |
| Silica | 5 | 5 | 5 | 5 | 5 | 5 |
| Mullite | 5 | 5 | 5 | 5 | 5 | 5 |
| Niobium Oxide | 1 | — | — | — | 1 | — |
| Antimony Oxide | — | 1 | — | — | — | — |
| Tungsten Oxide | — | — | 1 | — | — | — |
| Alkaline Total | <0.2 | <0.2 | <0.2 | <0.2 | <0.2 | <0.2 |
| Baking Temp. (°C.) | 1300 | 1300 | 1300 | 1300 | 1300 | 1300 |
| Porosity (%) | 26.2 | 22.7 | 24.5 | 23.3 | 25.2 | 22.8 |
| Specific Surface Area (m²/g) | 0.14 | 0.09 | 0.12 | 0.11 | 0.13 | 0.10 |
| Radical Crushing Load (kg) | 10.0 | 11.7 | 10.5 | 10.1 | 26.0 | 25.4 |
| Outer Diameter (mm) | 6.9 | 6.9 | 6.9 | 6.9 | Spherical, Diameter: 5 mm | |
| Inner Diameter (mm) | 4.0 | 3.9 | 4.0 | 3.7 | | |
| Length (mm) | 7.0 | 6.8 | 6.9 | 7.3 | | |

TABLE 2

| | | Carrier | Catalyst | Composition of Catalytically Active Component (Weight Ratio) | | | | | |
|---|---|---|---|---|---|---|---|---|---|
| | | | | $V_2O_5$ | $TiO_2$ | $Nb_2O_5$ | $P_2O_5$ | $Cs_2O$ | $Sb_2O_3$ |
| Embodiment 1 | Prior Stage | (1) | (A) | 2 | 98 | 0.5 | 0.2 | 0.35 | 2.0 |
| | Subsequent Stage | (1) | (B) | 2 | 98 | 0.5 | 0.8 | 0.35 | 2.0 |
| Embodiment 2 | Prior Stage | (2) | (C) | 2 | 98 | 0.5 | 0.2 | 0.35 | 2.0 |
| | Subsequent Stage | (2) | (D) | 2 | 98 | 0.5 | 0.8 | 0.35 | 2.0 |
| Embodiment 3 | Prior Stage | (3) | (E) | 2 | 98 | 0.5 | 0.2 | 0.35 | 2.0 |
| | Subsequent Stage | (3) | (F) | 2 | 98 | 0.5 | 0.8 | 0.35 | 2.0 |
| Comparative Example 1 | Prior Stage | (4) | (G) | 2 | 98 | 0.5 | 0.2 | 0.35 | 2.0 |
| | Subsequent Stage | (4) | (H) | 2 | 98 | 0.5 | 0.8 | 0.35 | 2.0 |

TABLE 3

| | | Carrier | Catalyst | Composition of Catalytically Active Component (Weight Ratio) | | | | | | | |
|---|---|---|---|---|---|---|---|---|---|---|---|
| | | | | $V_2O_5$ | $TiO_2$ | $Nb_2O_5$ | $P_2O_5$ | $Cs_2O$ | $Ag_2O$ | $Sb_2O_3$ | $K_2O$ |
| Embodiment 4 | Prior Stage | (1) | (K) | 15 | 85 | 0.4 | 0.3 | 0.1 | 1.0 | 2.0 | 0.1 |
| | Subsequent Stage | (1) | (L) | 15 | 85 | 0.4 | 0.9 | 0.1 | 1.0 | 2.0 | 0.1 |
| Comparative Example 2 | Prior Stage | (4) | (M) | 15 | 85 | 0.4 | 0.3 | 0.1 | 1.0 | 2.0 | 0.1 |
| | Subsequent Stage | (4) | (N) | 15 | 85 | 0.4 | 0.9 | 0.1 | 1.0 | 2.0 | 0.1 |

TABLE 4

| | | Carrier | Catalyst | Composition of Catalytically Active Component (Mole Ratio) | | | | | |
|---|---|---|---|---|---|---|---|---|---|
| | | | | $V_2O_5$ | $MoO_3$ | $Na_2O$ | $P_2O_5$ | $Cs_2O$ | $Ag_2O$ |
| Embodiment 5 | Prior Stage | (1) | (O) | 1 | 0.8 | 0.07 | 0.02 | 0.008 | 0.06 |
| | Subsequent Stage | (1) | (P) | 1 | 0.8 | 0.08 | 0.02 | 0.002 | 0.06 |
| Comparative Example 3 | Prior Stage | (4) | (Q) | 1 | 0.8 | 0.07 | 0.02 | 0.008 | 0.06 |
| | Subsequent Stage | (4) | (R) | 1 | 0.8 | 0.08 | 0.02 | 0.002 | 0.06 |

TABLE 5

| | | Carrier | Catalyst | Composition of Catalytically Active Component (Mole Ratio) | | | | | | | |
|---|---|---|---|---|---|---|---|---|---|---|---|
| | | | | $V_2O_5$ | $TiO_2$ | $Sb_2O_3$ | $MoO_3$ | $P_2O_5$ | $Ag_2O$ | CaO | Whisker |
| Embodiment 6 | Prior Stage | (1) | (S) | 4 | 100 | 1.2 | — | — | — | — | — |
| | Subsequent Stage | (1) | (T) | 1 | — | — | 0.20 | 0.03 | 0.1 | 0.04 | 5.1 |
| Comparative | Prior Stage | (4) | (U) | 4 | 100 | 1.2 | — | — | — | — | — |
| Example 4 | Subsequent Stage | (4) | (V) | 1 | — | — | 0.20 | 0.03 | 0.1 | 0.04 | 5.1 |

*1) Whisker is denoted in weight percent to the total of the catalytically active component.

TABLE 6

| | Carrier | Catalyst | Composition of Catalytically Active Component (Mole Ratio) | | | |
|---|---|---|---|---|---|---|
| | | | $VO_5$ | $Sb_2O_3$ | $TiO_2$ | $SiO_2$ |
| Embodiment 7 | (5) | (W) | 1 | 1.75 | 22.1 | 3.9 |
| Comparative Example 5 | (6) | (X) | 1 | 1.75 | 22.1 | 3.9 |

TABLE 7

| | Early Phase of Reaction | | | After 3 Months | | |
|---|---|---|---|---|---|---|
| | Reaction Temp. (° C.) | Yield of Phthalic Anhydride (Weight percent) | Yield of Phthalide (Mole percent) | Reaction Temp. (° C.) | Yield of Phthalic Anhydride (Weight percent) | Yield of Phthalide (Mole percent) |
| Embodiment 1 | 349 | 112.1 | 0.08 | 349 | 112.0 | 0.06 |
| Embodiment 2 | 350 | 111.9 | 0.08 | 350 | 111.9 | 0.07 |
| Embodiment 3 | 352 | 111.8 | 0.08 | 352 | 111.6 | 0.07 |
| Comparative Example 1 | 353 | 110.5 | 0.08 | 353 | 109.5 | 0.20 |

TABLE 8

| | Early Phase of Reaction | | | After 3 Months | | |
|---|---|---|---|---|---|---|
| | Reaction Temp. (° C.) | Yield of Phthalic Anhydride (Weight percent) | Yield of Naphthoquinone (Mole percent) | Reaction Temp. (° C.) | Yield of Phthalic Anhydride (Weight percent) | Yield of Naphthoquinone (Mole percent) |
| Embodiment 4 | 361 | 103.5 | 0.87 | 361 | 103.4 | 0.48 |
| Comparative Example 2 | 360 | 101.9 | 0.85 | 360 | 100.5 | 1.20 |

TABLE 9

|  | Early Phase of Reaction | | | After 3 Months | | |
| --- | --- | --- | --- | --- | --- | --- |
|  | Reaction Temp. (° C.) | Yield of Maleic Anhydride (Weight percent) | Conversion of Benzene (%) | Reaction Temp. (° C.) | Yield of Maleic Anhydride (Weight percent) | Conversion of Benzene (%) |
| Embodiment 5 | 363 | 98.9 | 98.0 | 363 | 99.1 | 98.1 |
| Comparative Example 3 | 367 | 97.1 | 98.0 | 367 | 95.8 | 96.7 |

TABLE 10

|  | Early Phase of Reaction | | After 3 Months | |
| --- | --- | --- | --- | --- |
|  | Reaction Temp. (° C.) | Yield of Pyromellitic Anhydride (Mole percent) | Reaction Temp. (° C.) | Yield of Pyromellitic Anhydride (Mole percent) |
| Embodiment 6 | 398 | 67.5 | 398 | 67.3 |
| Comparative Example 4 | 395 | 65.3 | 395 | 62.8 |

TABLE 11

|  | Early Phase of Reaction | | After 6 Months | |
| --- | --- | --- | --- | --- |
|  | Reaction Temp. (° C.) | Yield of Benzonitrile (Mole percent) | Reaction Temp. (° C.) | Yield of Benzonitrile (Mole percent) |
| Embodiment 7 | 390 | 87.7 | 390 | 87.3 |
| Comparative Example 5 | 393 | 85.4 | 393 | 83.2 |

TABLE 12

|  |  | Carrier | Catalyst | Results of Analysis (Weight Percent) | | |
| --- | --- | --- | --- | --- | --- | --- |
|  |  |  |  | $K_2O$ | $Na_2O$ | CaO |
| Embodiment 1 | Before use | (1) | (A) | 0.005 | 0.010 | 0.002 |
|  | After 3 months | (1) | (A) | 0.011 | 0.007 | 0.013 |
| Embodiment 2 | Before use | (2) | (C) | 0.006 | 0.009 | 0.003 |
|  | After 3 months | (2) | (C) | o.o1o | 0.010 | 0.010 |
| Embodiment 3 | Before use | (3) | (E) | 0.004 | 0.010 | 0.002 |
|  | After 3 months | (3) | (E) | 0.009 | 0.007 | 0.012 |
| Comparative Example 1 | Before use | (4) | (G) | 0.018 | 0.026 | 0.004 |
|  | After 3 months | (4) | (G) | 0.027 | 0.045 | 0.059 |

It is understood clearly from the comparison of the results of Embodiments and Comparative Examples that in a catalytic gas-phase oxidation reaction manufacturing phthalic anhydride from o-xylene, a catalytic gas-phase oxidation reaction manufacturing phthalic anhydride from naphthalene, a catalytic gas-phase oxidation reaction manufacturing maleic anhydride from benzene, a catalytic gas-phase oxidation reaction manufacturing pyromellitic anhydride from durene, and a catalytic gas-phase oxidation reaction manufacturing benzonitrile from toluene, the catalyst for catalytic oxidation use in accordance with the present invention results in no deterioration over a period of time, such as a drop in the yield of a targeted acid anhydride and nitrile compound and an increase in amount of byproducts, and therefore exhibits stable catalytic activity over a period of time. It is also understood that since the carrier of the catalyst for catalytic oxidation use in accordance with the present invention contains at least one oxide A selected from the group consisting of a niobium oxide, an antimony oxide, and a tungsten oxide, the catalyst for catalytic oxidation use in accordance with the present invention improves the yield and selectivity of a targeted acid anhydride and nitrile compound.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A catalyst for catalytic oxidation use, comprising:

a carrier containing silicon carbide, an inorganic bonding component, and at least one oxide selected from the group consisting of a niobium oxide, an antimony oxide, and a tungsten oxide; and at least one oxide selected from the group consisting of a vanadium oxide and a molybdenum oxide as catalytically active component carried by the carrier.

2. The catalyst for catalytic oxidation use as defined in claim 1, wherein the inorganic bonding component is at least one inorganic material selected from the group consisting of silicon dioxide and mullite.

3. The catalyst for catalytic oxidation use as defined in claim 1, wherein the carrier contains at least one 0.1 weight parts to 2 weight parts oxide selected from the group consisting of a niobium oxide, an antimony oxide, and a tungsten oxide, with the total amount of the silicon carbide and the inorganic bonding component taken to be 100 weight parts.

4. The catalyst for catalytic oxidation use as defined in claim 1, wherein the carrier contains 70 weight percent to 95 weight percent silicon carbide, 20 weight percent to 3 weight percent silicon dioxide as inorganic bonding component, and 10 weight percent to 2 weight percent mullite as inorganic bonding component, with the total amount of the silicon carbide and the inorganic bonding component taken to be 100 weight percent.

5. The catalyst for catalytic oxidation use as defined in claim 1, wherein the carrier contains a 0.5 weight percent or less alkaline metal and alkaline earth metal in total amount, and has a porosity of 16% to 35% and a specific surface area of not less than $0.02m^2/g$ and not more than $0.3m^2/g$.

6. The catalyst for catalytic oxidation use as defined in claim 1, comprising:

vanadium pentoxide as the vanadium oxide as the catalytically active component;

anatase-type titanium dioxide; and at least one element selected from the group consisting of alkali metal elements, rare earth elements, sulfur, phosphorus, antimony, niobium, and boron;

wherein the catalyst for catalytic oxidation use is used for manufacturing phthalic anhydride from o-xylene and/or naphthalene.

7. The catalyst for catalytic oxidation use as defined in claim 1, comprising:

vanadium pentoxide as the vanadium oxide and molybdenum trioxide as a molybdenum oxide as the catalytically active component;

phosphorus pentoxide; and at least one element selected from the group consisting of alkali metal elements, alkaline earth metal elements, and thallium;

wherein the catalyst for catalytic oxidation use is used for manufacturing maleic anhydride from benzene.

8. The catalyst for catalytic oxidation use as defined in claim 1, comprising:

vanadium pentoxide as the vanadium oxide as the catalytically active component;

phosphorus;

molybdenum and/or tungsten;

at least one element selected from the group consisting of antimony, silver, boron, chromium, cerium, niobium, and sulfur;

at least one element selected from the group consisting of alkali metal elements, alkaline earth metal elements, and thallium; and at least one oxide selected from the group consisting of a titanium oxide, a zirconium oxide, and a tin oxide, wherein the catalyst for catalytic oxidation use is used for manufacturing pyromellitic anhydride from 1,2,4,5-tetralkyl benzene.

9. The catalyst for catalytic oxidation use as defined in claim 1, comprising:

vanadium pentoxide as the vanadium oxide, and at least one oxide selected from the group consisting of titanium dioxide, silicon dioxide, alumina, diatom earth, a double oxide containing titanium and silicon, a double oxide containing titanium and zirconium, and a triple oxide containing titanium, silicon, and zirconium as the catalytically active component; and at least one element selected from the group consisting of molybdenum, tungsten, chromium, antimony, bismuth, phosphorus, niobium, iron, cobalt, nickel, manganese, and copper, wherein the catalyst for catalytic oxidation use is used for manufacturing an aromatic nitrile or a heterocyclic nitrile from an alkyl-substituted aromatic hydrocarbon or an alkyl-substituted heterocyclic compound.

10. A method of manufacturing phthalic anhydride from o-xylene and/or naphthalene, comprising the step of using a catalyst for catalytic oxidation, the catalyst at least including:

a carrier containing silicon carbide, an inorganic bonding component, and at least one oxide selected from the group consisting of a niobium oxide, an antimony oxide, and a tungsten oxide; and a component carried by the carrier, at least including:
at least one oxide selected from the group consisting of a vanadium pentoxide and a molybdenum oxide as the catalytically active component;
anatase-type titanium dioxide; and
at least one element selected from the group consisting of alkali metal elements, rare earth elements, sulfur, phosphorus, antimony, niobium, and boron.

11. A method of manufacturing maleic anhydride from benzene, comprising the step of using a catalyst for catalytic oxidation, the catalyst at least including:

a carrier containing silicon carbide, an inorganic bonding component, and at least one oxide selected from the group consisting of a niobium oxide, an antimony oxide, and a tungsten oxide; and a component carried by the carrier, at least including:
at least one oxide selected form the group consisting of a vanadium pentoxide and a molybdenum trioxide as the catalytically active component carried by the carrier;
phosphorus pentoxide; and
at least one element selected from the group consisting of alkali metal elements, alkaline earth metal elements, and thallium.

12. A method of manufacturing pyromellitic anhydride from 1,2,4,5-tetralkyl benzene comprising the step of using a catalyst for catalytic oxidation, the catalyst at least including:

a carrier containing silicon carbide, an inorganic bonding component, and at least one oxide selected from the group consisting of a niobium oxide, an antimony oxide, and a tungsten oxide; and a component carried by the carrier, at least including:
at least one oxide selected from the group consisting of a vanadium pentoxide and a molybdenum oxide as the catalytically active component carried by the carrier;
phosphorus;
molybdenum and/or tungsten;
at least one element selected form the group consisting of antimony, silver, boron, chromium, cerium, niobium, and sulfur;
at least one element selected from the group consisting of alkali metal elements, alkaline earth metal elements, and thallium; and
at least one oxide selected from the group consisting of a titanium oxide, a zirconium oxide, and a tin oxide.

13. A method of manufacturing an aromatic nitrite or a heterocyclic nitrite from an alkyl-substituted aromatic hydrocarbon or an alkyl-substituted heterocyclic compound by ammoxidation, comprising the step of using a catalyst for catalytic oxidation to manufacture an aromatic nitrile or a heterocyclic nitrile from an alkyl-substituted aromatic hydrocarbon or an alkyl-substituted heterocyclic compound, the catalyst at least including:

a carrier containing silicon carbide, an inorganic bonding component, and at least one oxide selected from the group consisting of a niobium oxide, an antimony oxide, and a tungsten oxide; and a component carried by the carrier, at least including:
at least one oxide selected from the group consisting of vanadium pentoxide, and at least one oxide selected from the group consisting of titanium dioxide, silicon dioxide, alumina, diatom earth, a double oxide containing titanium and silicon and a double oxide containing titanium and zirconium, and a triple oxide containing titanium, silicon, and zirconium, as the catalytically active component; and
at least one element selected from the group consisting of molybdenum, tungsten, chromium, antimony, bismuth, phosphorus, niobium, iron, cobalt, nickel, manganese, and copper.

* * * * *

UNITED STATES PATENT AND TRADEMARK OFFICE
CERTIFICATE OF CORRECTION

PATENT NO.: 6,133,184
DATED : October 17, 2000
INVENTOR(S): Yasushi KIYOOKA, et al.

It is certified that errors appear in the above-identified patent and that said Letters Patent is hereby corrected as shown below:

Title page, item
[56] ... U.S. Patent Documents,
    change "57-105241" to --57-105241A--.

Column 6,
    line 66, change "phosphorus" to --phosphorous--.

Column 7,
    line 13, change "phosphorus" to --phosphorous--;
    line 30, change "phosphorus" to --phosphorous--;
    line 54, change "titan" to --titanium--;
    line 55, change "titan" to --titanium--; and
    line 59, change "phosphorus" to --phosphorous--.

Column 16,
    line 12, change "titan" to --titanium--.*

Columns 19 and 20,
    Table 6, change "$VO_5$" to --$V_2O_5$--; and
    Table 7, change "11i.9" to --111.9--.

Column 21,
    Table 12, change "o.o1o" to --0.010--.

UNITED STATES PATENT AND TRADEMARK OFFICE
CERTIFICATE OF CORRECTION

PATENT NO.:    6,133,184
DATED     :    October 17, 2000
INVENTOR(S):   Yasushi KIYOOKA, et al.

It is certified that errors appear in the above-identified patent and that said Letters Patent is hereby corrected as shown below:

Column 23,
    line 3, change "phosphorus" to --phosphorous--;
    line 11, change "phosphorus" to --phosphorous--;
    line 22, change "phosphorus" to --phosphorous--;
    line 46, change "phosphorus" to --phosphorous--; and
    line 67, change "phosphorus" to --phosphorous--.

Column 24,
    line 64, change "phosphorus" to --phosphorous--.

Signed and Sealed this

Fifteenth Day of May, 2001

*Attest:*

NICHOLAS P. GODICI

*Attesting Officer*       *Acting Director of the United States Patent and Trademark Office*